(12) United States Patent
Sosnowski et al.

(10) Patent No.: US 7,364,096 B1
(45) Date of Patent: Apr. 29, 2008

(54) SPRAYER WITH PIVOTAL WING BOOMS HAVING FORWARD AND REVERSE BREAKAWAY AND FOLDED X-SHAPED TRANSPORT POSITION

(75) Inventors: Timothy P. Sosnowski, Eden Prairie, MN (US); Robert J. Bisson, Savage, MN (US); Bart T. Ellson, Excelsior, MN (US); David J. Norlander, Cottage Grove, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 11/411,435

(22) Filed: Apr. 26, 2006

(51) Int. Cl.
*B05B 1/20* (2006.01)
*E01C 19/17* (2006.01)
*E01H 3/02* (2006.01)
*A01C 23/02* (2006.01)

(52) U.S. Cl. ............ 239/168; 239/166; 239/167; 239/172

(58) Field of Classification Search ........... 239/168, 239/166, 167, 172, 159–165, 288
See application file for complete search history.

(56) References Cited

U.S. PATENT DOCUMENTS

| 3,565,340 | A | | 2/1971 | Melnert |
| 4,634,051 | A | | 1/1987 | Dudley |
| 5,012,608 | A | | 5/1991 | Brown |
| 5,431,341 | A | * | 7/1995 | Broyhill ............ 239/74 |
| 5,520,335 | A | | 5/1996 | Claussen et al. |
| 6,119,963 | A | * | 9/2000 | Bastin et al. ........... 239/168 |
| 6,138,770 | A | * | 10/2000 | Kayser ............... 172/677 |
| 6,422,483 | B1 | * | 7/2002 | Yocom et al. ......... 239/159 |
| 7,063,273 | B2 | | 6/2006 | Hahn |
| 2002/0109016 | A1 | * | 8/2002 | Guesdon ............. 239/166 |
| 2006/0011741 | A1 | * | 1/2006 | Hahn et al. ........... 239/172 |

FOREIGN PATENT DOCUMENTS

GB          717249        10/1954

* cited by examiner

*Primary Examiner*—Darren Gorman
(74) *Attorney, Agent, or Firm*—James W. Miller

(57) ABSTRACT

This invention relates to a sprayer having a center boom and pivotal wing booms. The wing booms can be pivoted from an extended spray position to an elevated transport position by lifting and lowering each wing boom about a longitudinal lift pivot axis. In addition, each wing boom can bi-directionally breakaway relative to the center boom by virtue of a breakaway pivot arranged between the lift pivot axis and the innermost end of the wing boom. The breakaway pivot has at least one pair of nested cams that are biased into their nested condition by at least one spring. The center boom carries a pair of support cradles that direct or cam one wing boom forwardly and the other wing boom rearwardly as the wing booms are lifted into the transport position such that the wing booms form an X-shape relative to one another. The support cradles are partially flexible to allow the wing booms to release from the cradles if they strike an obstruction.

20 Claims, 12 Drawing Sheets

SPRAYER WITH PIVOTAL WING BOOMS HAVING FORWARD AND REVERSE BREAKAWAY AND FOLDED X-SHAPED TRANSPORT POSITION

TECHNICAL FIELD

This invention relates to a sprayer for spraying liquids, such as liquid fertilizer, insecticides, herbicides and the like, for horticultural purposes. More particularly, this invention relates to a sprayer having a center boom and a pair of pivotal wing booms.

BACKGROUND OF THE INVENTION

Vehicle mounted sprayers of various types are well known for spraying liquids used for growing and maintaining a healthy turf surface or for other horticultural purposes. Such vehicle mounted sprayers are particularly useful for spraying large turf areas that would be too time consuming to treat with handheld or walk behind sprayers.

In order to increase the width of the spray, many vehicle mounted sprayers include a center boom that is fixed to the vehicle. A pair of wing booms are pivotally attached to each end of the center boom. In a spraying position, the wing booms are extended horizontally outward from and laterally aligned with the center boom so that the spray width is often substantially larger than the width of the vehicle. In this case, the outer ends of the wing booms stick laterally outwardly beyond the lateral wheelbase of the vehicle.

In sprayers with a pair of wing booms, the wing booms can typically be folded into a transport position to decrease the width of the sprayer. This allows the sprayer to fit through narrower spaces or to be transported along a roadway. Some sprayers fold the wing booms in horizontal planes until the wing booms extend longitudinally flush along each side of the vehicle. Other sprayers fold the wing booms vertically with the wing booms sticking upwardly at each side of the vehicle. The net result in either case is to decrease the width of the sprayer.

When the wing booms fold vertically, they extend upwardly quite high which can lead to various problems. For example, if the wing booms are long, they can extend so high when folded up that they would strike low lying branches or be unable to pass through restricted height spaces, such as tunnels. This problem can be somewhat alleviated, but not entirely eliminated, by folding the booms into an X-shaped transport position where each wing boom crosses over the other wing boom. This lowers the height of the upper ends of the wing booms at least somewhat from the height they would have if the wing booms projected purely vertically.

However, when folding the wing booms vertically into an X-shaped transport position, the wing booms must also be displaced longitudinally to avoid hitting one another. This has been done in some cases in the past by having relatively complicated pivot structures. It would be an advance in the art to be able to fold the wing booms into an X-shaped transport position using a simple, durable pivot.

Another problem with known sprayers is the possibility of damage to the folded wing booms due to impact with low-overhead objects while the wing booms are in their transport positions during a transport event. The state of the art is that the wing booms will often bend or break as a result of this type of impact. This is obviously not desirable.

Another problem with known sprayers is the possibility of damage when the wing booms are in their horizontal, extended spraying position. Because the wing booms stick outwardly well beyond the sides of the vehicle, and because it can be difficult to judge the clearance between the ends of the wing booms and an obstacle, it is not unusual for the operator to drive the ends of the wing booms into an obstacle, such as a tree or post. This impact can damage the wing boom and/or the obstacle struck by the wing boom. In the case of a tree, the wing boom can scar or damage the tree in such a way that its appearance is permanently marred or its health impaired significantly enough to require replacement of the tree. Either result is unfortunate.

Sprayers attempt to mitigate this problem by allowing the wing boom to pivot or breakaway if the wing boom strikes an obstacle. However, this is most often done only if the wing boom strikes an obstacle when the vehicle is moving forwardly. If the wing boom strikes an obstacle during reverse motion of the vehicle, there usually is no similar breakaway feature. Thus, it would be a further advance in the art to provide a wing boom with bi-directional breakaway capability.

In addition, when a wing boom breaks away, it must be reset into its usual position to resume spraying. In some wing booms that breakaway, this must be done manually by the operator. Obviously, this is a time consuming and onerous process since the operator must stop the vehicle, dismount the vehicle, reset the wing boom, and then remount and start the vehicle to resume spraying. A wing boom that is self-resetting using a simple and durable breakaway structure would also be desirable.

Finally, to the extent that the obstacle that causes the wing boom to breakaway is a tree or plant, there will be some contact between the wing boom and the tree or plant even if the wing boom breaks away. In fact, it is this contact that provides the force required to pivot the wing boom during a breakaway operation. The tree or plant can still be damaged as result of this contact. It is desirable to minimize the chance of any significant damage by making the outer end of the wing boom more tree or plant friendly.

SUMMARY OF THE INVENTION

One aspect of this invention relates to a sprayer for spraying a liquid onto an upwardly facing surface. The sprayer is carried on a vehicle for moving the sprayer over the surface. The sprayer comprises a center boom carried on the vehicle. A pair of wing booms are pivotally mounted to opposite ends of the center boom. A plurality of downwardly facing spray nozzles are carried on the center and wing booms for spraying liquid downwardly onto the upwardly facing surface. A breakaway pivot is provided between each wing boom and each end of the center boom. Each breakaway pivot is configured to permit bi-directional pivoting of the wing boom relative to the center boom should the wing boom strike an obstruction during forward or reverse motion of the sprayer.

Another aspect of this invention relates to a sprayer for spraying a liquid onto an upwardly facing surface. The sprayer is carried on a vehicle for moving the sprayer over the surface. The sprayer comprises a center boom carried on the vehicle. A pair of wing booms are pivotally mounted to opposite ends of the center boom for pivoting about longitudinal lift pivot axes to permit the wing booms to be raised into a vertically elevated transport position. A plurality of downwardly facing spray nozzles are carried on the center and wing booms for spraying liquid downwardly onto the upwardly facing surface. A pair of members are arranged on the center boom to direct or cam one wing boom forwardly and the other wing boom rearwardly as the wing booms are lifted into their transport position to place the wing booms in an X-shaped transport position relative to one another.

Yet another aspect of this invention relates to a sprayer for spraying a liquid onto an upwardly facing surface. The sprayer is carried on a vehicle for moving the sprayer over the surface. The sprayer comprises a center boom carried on the vehicle. A pair of wing booms are pivotally mounted to opposite ends of the center boom. A plurality of downwardly facing spray nozzles are carried on the center and wing booms for spraying liquid downwardly onto the upwardly facing surface. Laterally outermost ends of the wing booms have rounded front and rear corners to prevent damage to trees.

Moreover, another aspect of this invention relates to a sprayer for spraying a liquid onto an upwardly facing surface. The sprayer is carried on a vehicle for moving the sprayer over the surface. The sprayer comprises a center boom carried on the vehicle. A pair of wing booms are pivotally mounted to opposite ends of the center boom. The wing booms can be folded upwardly relative to the center boom to dispose the wing booms in a vertically elevated transport position. A plurality of downwardly facing spray nozzles are carried on the center and wing booms for spraying liquid downwardly onto the upwardly facing surface. A pair of cradles retain the wing booms in their elevated transport positions. The cradles have a whip spring to allow the cradles to flex or tip relative to the center boom to release the wing booms from the cradles should a wing boom hit a low-overhead obstruction.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
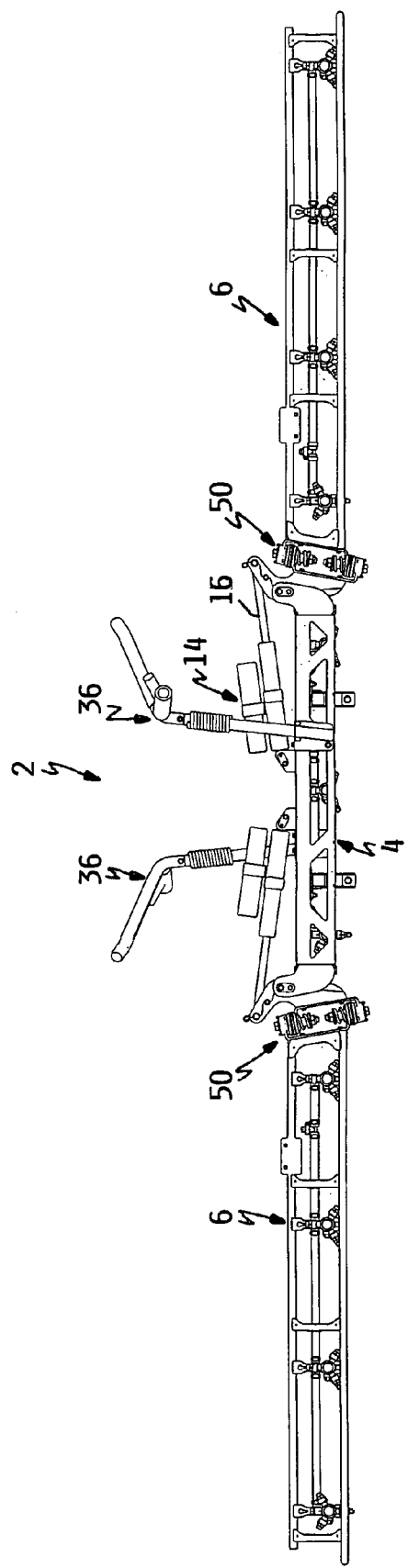
FIG. 1 is a front elevational view of a sprayer according to this invention, particularly illustrating the center boom and the wing booms in the extended spray position.
Figure 3:
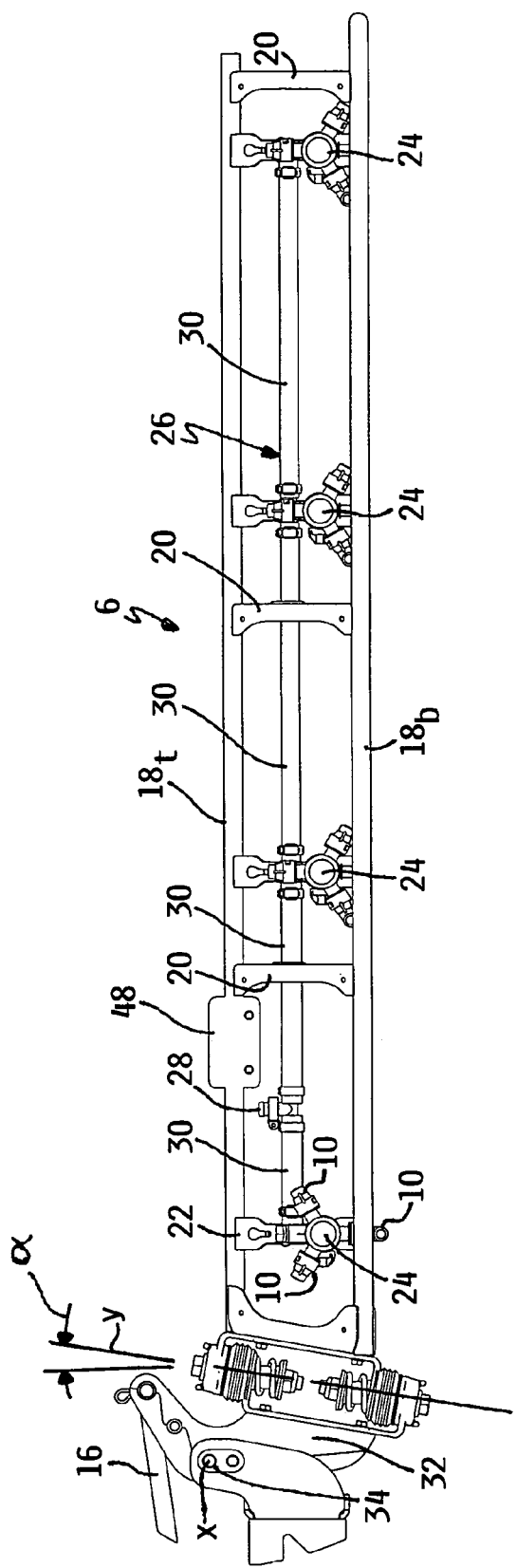
FIG. 3 is an enlarged front elevational view of one of the wing booms of the sprayer of FIG. 1.
Figure 4:
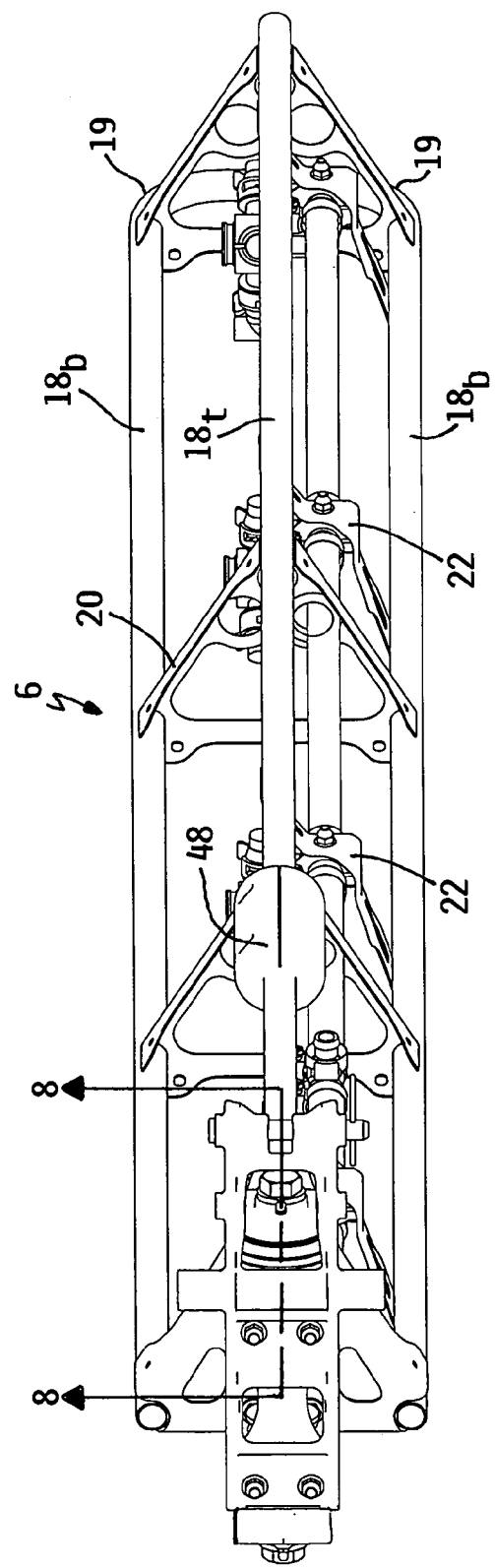
FIG. 4 is an enlarged top plan view of one of the wing booms of the sprayer of FIG. 1.

One embodiment of a sprayer according to this invention is illustrated as 2 in FIG. 1. Sprayer 2 comprises a center boom 4 and a pair of pivotal wing booms 6. A laterally inner end of each wing boom 6 is pivotally coupled to a laterally outer end of center boom 4. Each wing boom pivots relative to center boom 4 about two pivot axes, namely a fore-and-aft extending lift pivot axis x and a substantially vertical but somewhat inclined breakaway pivot axis y. See FIG. 3.

Center boom 4 carries a pair of hitch arms or mounts 8 that allow sprayer 2 to be carried on a transport vehicle (not shown), such as a tractor, mower or utility vehicle. The vehicle carries sprayer 2 over the ground in a forward direction F and in a reverse direction R as indicated by the arrows F and R in FIG. 5. The vehicle will also carry a tank (not shown) of a liquid, such as a fertilizer, insecticide, and herbicide. This liquid will be pumped out of the tank and sprayed onto the ground through a plurality of spray nozzles 10 carried on center boom 4 and wing booms 6.

The Center and Wing Boom Structures

Center boom 4 has a box-like cross section that includes a top wall 12. A pair of electro-hydraulic actuators 14, one for each wing boom 6, are pivotally mounted to top wall 12 of center boom 4. Each actuator 14 comprises a hydraulic cylinder, an integrated hydraulic fluid reservoir, and an electric motor for pumping fluid from the reservoir to extend a piston rod 16. The electric motor is powered by a source of electric power carried on the vehicle. However, since the hydraulic fluid reservoir and connections are integrated into actuator 14, there is no need for hydraulic hoses extending back to the vehicle, thereby lessening the danger of hydraulic oil leaks. One suitable actuator 14 comprises an MMP (Mini-Motion Package) linear hydraulic actuator, Model MMP3BlB300CC, manufactured by KYB Corporation.

Each wing boom 6 comprises an elongated, open truss formed by a plurality of elongated, parallel stringers 18. Stringers 18 are rigidly secured together by triangular supports 20 spaced along the length of wing boom 6 such that wing boom 6 has a generally triangular cross-section. In other words, when looking down at a wing boom 6, each wing boom 6 has a top stringer $18_t$ and a pair of bottom stringers $18_b$ arranged at the corners of a triangle. In addition to supports 20 that unite stringers 18, a plurality of nozzle mounting brackets 22 extend between top stringer $18_t$ and at least one bottom stringer $18_b$, further adding strength and rigidity to wing boom 6.

Each mounting bracket 22 supports at least one spray nozzle 10. A single, downwardly facing nozzle 10 could be carried on bracket 22. However, a rotatable nozzle turret 24 having three nozzles 10 is preferably used instead of a single fixed nozzle 10. One nozzle turret 24 having three nozzles 10 that could be used is a model QJ360C-DB manufactured by Spraying Systems Co. of Wheaton, Ill.

Each bracket 22 is designed to fit the body of turret 24. Bracket 22 is designed to prevent both inadvertent twisting of the body of turret 24 (about an axis that is up-down) and inadvertent rotating of the body of turret 24 (about an axis that is horizontal) in the event of contact between nozzle 10 and some object. The anti-twist feature is accomplished by bracket 22 having the bracket sides turned down to hold the top edge of the body of turret 24. The anti-rotation is accomplished by changing the turret body mount to a direct bolt onto a horizontal "plane" in bracket 22.

Each nozzle turret 24 is rotatable on its mounting bracket 22 to position a selected nozzle 10 in an operative spray position with the spray outlet of nozzle 10 facing the ground. Each nozzle 10 has a different volumetric flow capacity and/or spray pattern so that a desired nozzle 10 can be used at any given time by selective rotation of turret 24. Regardless of which nozzle 10 is used, turret 24 and nozzles 10 are, for the most part, entirely contained within the triangular cross-section of each wing boom 6. In this position, they are substantially protected from damage should sprayer 2 be backed into an object or should wing booms 6 strike an obstruction.

Turrets 24 in each wing boom 6 are connected together by a liquid conduit 26 having an inlet 28 that receives liquid from the tank of such liquid carried on the vehicle. Conduit 26 is made from a plurality of hoses 30 that are coupled by hose connectors to adjacent turrets 24. See FIG. 3. When necessary, hoses 30 pass through openings in supports 20 of each wing boom 6.

Center boom 4 carries a number of similar rotatable nozzle turrets 24 spaced laterally along the length of center boom 4 from one end to the other end. Again, turrets 24 in center boom 4 are operatively connected together by a conduit 26 made from a plurality of hoses 30. Both conduit 26 and turrets 24 are located within the interior cross-section of the box-shaped center boom 4. Thus, they are substantially protected from damage in the same way as on wing booms 6.

Center boom 4 is more robust than wing booms 6 because center boom 4 supports each wing boom 6 in a cantilever fashion. In addition, center boom 4 acts as a "bumper" to prevent nozzles 10 from being damaged or broken when another vehicle is parked behind sprayer 2 and the operator of the other vehicle runs into the rear of sprayer 2. Thus, center boom 4 needs to be able to withstand impacts from other machines driving into its rear and still protect nozzles 10.

Figure 5:
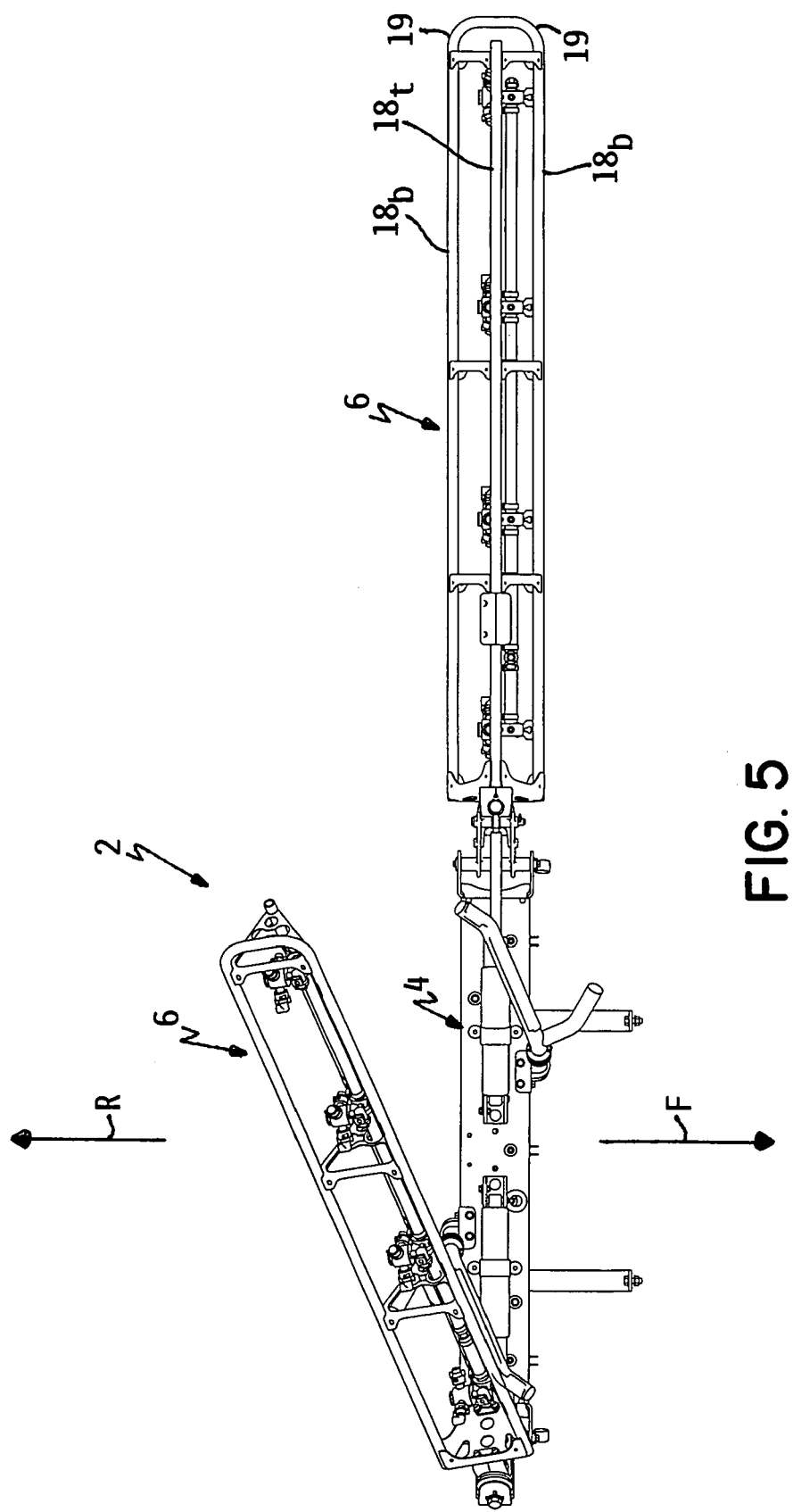
FIG. 5 is a top plan view of the sprayer of FIG. 1, particularly illustrating one of the wing booms in the folded transport position and the other of the wing booms in the extended spray position.

Referring to FIG. 5, each wing boom 6 has an outer end formed with rounded front and rear corners 19. This configuration helps prevent damage to trees and the like when wing boom 6 releases from the tree during a breakaway event, as will be described hereafter.

The Folded X-Shaped Transport Position of Wing Booms 6

The laterally inner end of each wing boom includes a bellcrank lever 32. One arm of lever 32 is connected to piston rod 16 of one actuator 14 carried on center boom 4. The other arm of lever 32 is connected to wing boom 6, albeit indirectly through the breakaway pivot 50 which will be described hereafter. Lever 32 is itself pivoted on center boom 4 for rotation about a longitudinally extending lift pivot 34 that defines lift pivot axis x.

Figure 2:
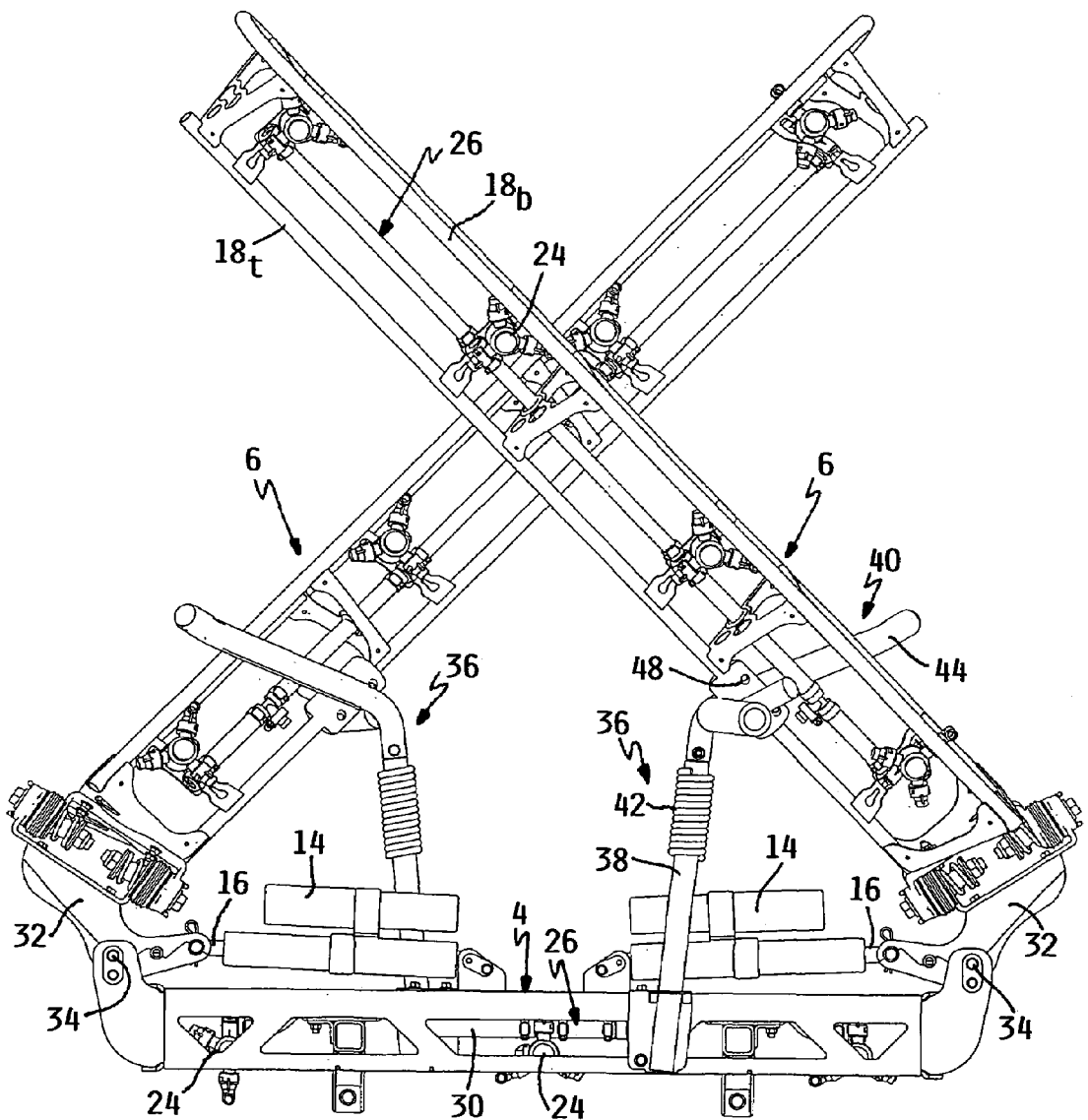
FIG. 2 is an enlarged front elevational view of the sprayer of FIG. 1, particularly illustrating the center boom and the wing booms in the folded X-shaped transport position with each wing boom being held within the arms of a forked support cradle.

When piston rods 16 of actuators 14 are extended, wing booms 6 are pivoted downwardly about lift pivots 34 until wing booms 6 are disposed in an end-to-end, laterally aligned manner with each end of center boom 4. This is the extended spray position of sprayer 2, as shown in FIG. 1, because wing booms 6 are extended to each side from center boom 4. However, to reduce the width of sprayer 2 for transport, piston rods 16 of actuators 14 can be withdrawn. This will pivot wing booms 6 to a transport position, as shown in FIG. 2, in which each wing boom is folded up and over a portion of center boom 4.

A pair of support cradles 36 are carried on center boom 4 for use with wing booms 6. Cradles 36 have three functions. First, cradles 36 direct or cam one wing boom 6 forwardly relative to center boom 4 and the other wing boom 6 rearwardly relative to center boom 4 so that wing booms 6 overlap and are longitudinally offset from one another in an X-shaped transport position as shown in FIG. 2. Second, cradles 36 hold and retain wing booms 6 in the transport position. Third, the "whip spring" feature of cradles 36 allow wing booms 6 to be released from cradles 36 without cradle or boom damage in the event of impact with a low overhead object during transport.

Cradles 36 are substantially identical to one another except that one cradle 36 is mounted to the front of center boom 4 and points to one side and the other cradle 36 is mounted to the rear of center boom 4 and points to the opposite side. Each cradle 36 includes a generally vertical lower post 38 that is bolted to the front or rear of center boom 4. In addition, each cradle 36 has a generally horizontally extending, forked top 40. A resilient coupling 42, such as an elongated spring, connects top 40 of cradle 36 to post 38 to allow top 40 of cradle 36 to bend or flex relative to post 38.

In this invention, cradles 36 have an integral spring 42 (a "whip spring") to permit wing booms 6 to be released out of cradle 36 with out suffering any damage. In the event that this "transport breakaway event" occurs, wing booms 6 can be reset into cradles 36 by cycling actuators 14 without the operator having to leave his or her seat.

Top 40 of cradle 36 includes a first, relatively long, laterally extending arm 44 and a second, shorter, laterally extending arm 46. First cradle arm 44 extends across the centerline of center boom 4 at an angle so as to form either a forwardly or rearwardly acting cam surface. When wing booms 6 are pivoted about their lift pivots 34, they will pivot in a plane that is coplanar with the centerline of center boom 4 until top stringer $18_t$ on each wing boom 6 hits or engages against first cradle arm 44 of its respective cradle 36. Then, further lifting of wing boom 6 will cause top stringer $18_t$ to ride along first cradle arm 44 with first cradle arm 44 camming wing boom 6 either forwardly or rearwardly of center boom 4 to place wing booms 6 into their X-shaped transport position.

When piston rod 16 of actuator 14 is fully extended and wing boom 6 is fully lifted, wing boom 6 will be nestled in the junction between first and second cradle arms 44 and 46 as shown in FIG. 2. Wing boom 6 has a cushioned slide 48 on top stringer $18_t$ thereof which will fit within the junction to protect wing booms 6 from wear or damage when held within cradle 36. Slide 48 will also ride on cradle arm 44 as wing boom 6 pivots into its folded transport position to help guide and protect wing boom 6. When fully received in cradle 36, wing boom 6 is inverted with top stringer $18_t$ lying in the junction between cradle arms 44 and 46 and one of the bottom stringers $18_b$ lying against first cradle arm 44.

Figure 6:
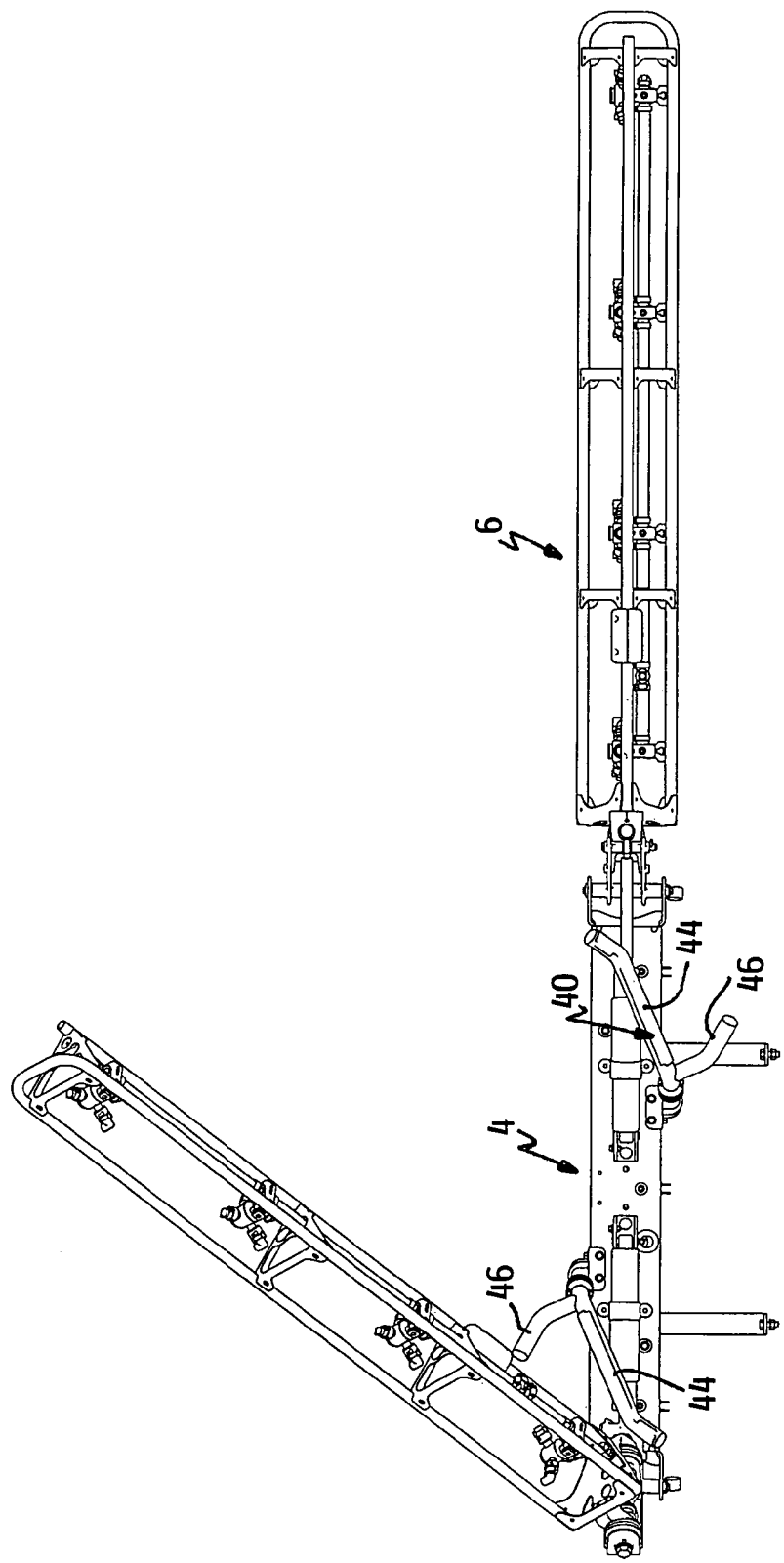
FIG. 6 is a top plan view similar to FIG. 5, particularly illustrating the wing boom in the folded transport position having slipped out of the support cradle due to the wing boom having struck an overlying obstruction during forward motion of the sprayer while the wing boom was in its folded transport position.

Should the upper ends of either wing boom 6 strike an obstruction while wing boom 6 is retained in cradle 36, wing boom 6 can pivot out of cradle 36 to avoid damage. Resilient coupling 42 allows top 40 of cradle 36 to bend or flex to release wing boom 6 from cradle 36 without damaging either wing boom 6 or cradle 36. FIG. 6 illustrates the condition of wing boom 6 and cradle 36 after wing boom 6 has been forced out of cradle 36.

The wing boom linkages (hinges, pivots, actuator, actuator stop, etc.) had to be designed to accommodate the movement needed by wing boom 6 as it releases from cradle 36. However, when designed to permit sufficient motion, wing boom 6 simply releases from cradle 36 in the event of impact with a low-overhead object while sprayer 2 is in transport mode. This happens without damage to wing boom 6 or cradle 36.

Obviously, some relative movement must be also be permitted in wing boom 6 as it gets cammed by first cradle arm 44 either forwardly or rearwardly of center boom 4. This is the some of the same movement needed by wing boom 6 to release from cradle 36. This relative movement is permitted by the structure of the breakaway pivot 50, which will now be described.

The Breakaway Pivot of Each Wing Boom

Breakaway pivot 50 comprises a first pivot part 52 bolted to lever 32 and a second pivot part 52 bolted to the laterally inner end of wing boom 6. Pivot parts 52 are identical to one another but are used inverted from one another. In other words, if pivot part 52 mounted to lever 32 is considered to be in an upright position, then pivot part 52 mounted to wing boom 6 will be in an upside down or inverted position. Thus, breakaway pivot 50 is formed from two identical pivot parts 52, thus decreasing the cost for manufacturing breakaway pivot 50.

Each pivot part 52 is U-shaped having facing, parallel end walls 54 connected together by a side wall 56. Side wall 56 carries a plurality of mounting holes 58 which allow pivot part 52 to be bolted to either lever 32 or wing boom 6. The surfaces on lever 32 and wing boom 6 to which side wall 56 is bolted are inclined relative to a purely vertical axis. Thus, breakaway pivot axis y provided by breakaway pivot 50 will also be inclined as indicated by the angle a in FIG. 3.

Figure 10:
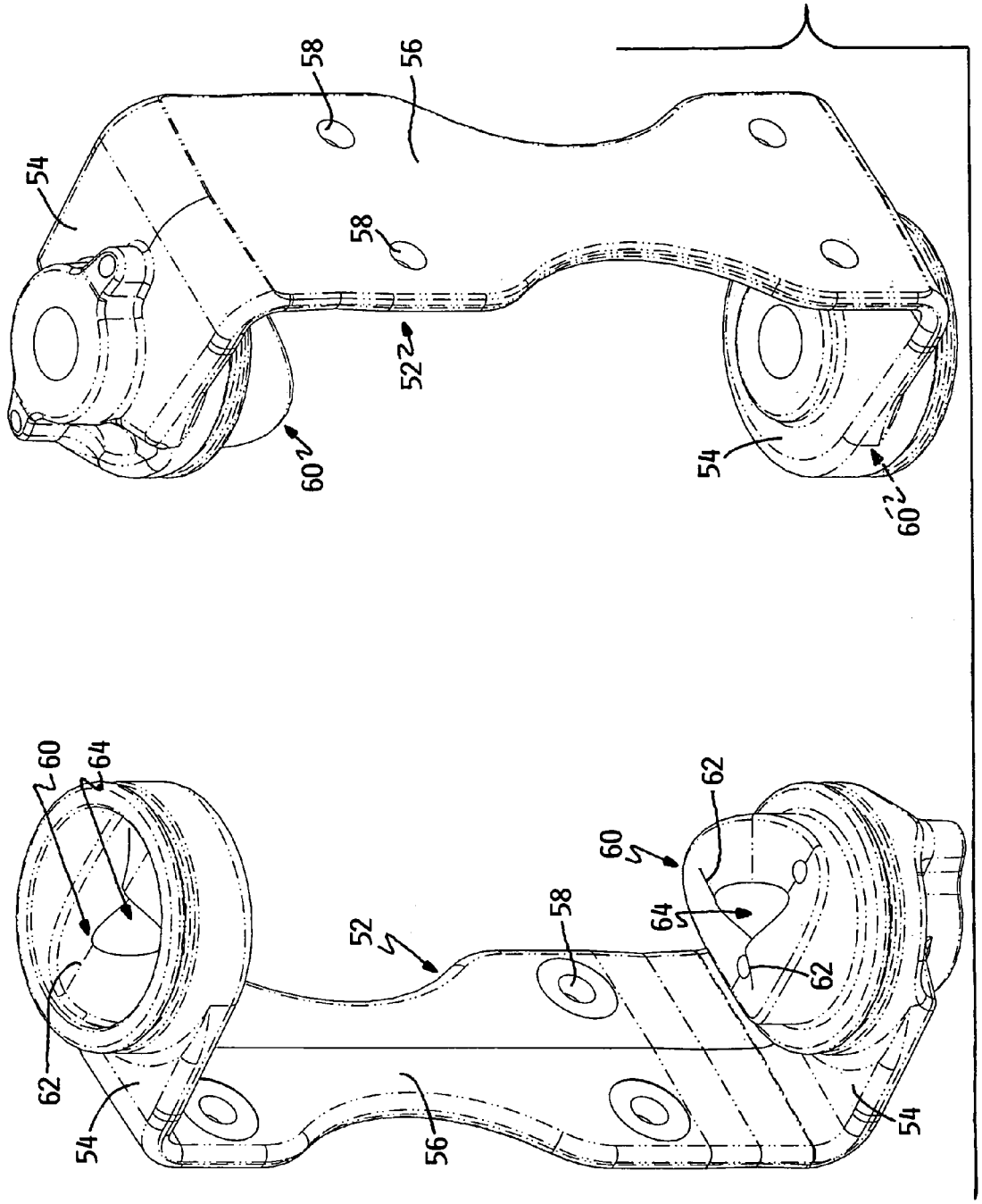
FIG. 10 is an exploded perspective view of portions of the breakaway pivot used on each wing boom, particularly illustrating the double lobed cams that permit the wing boom to breakaway relative to the center boom if the wing boom strikes an obstruction while the wing boom is in the extended spray position.
Figure 11:
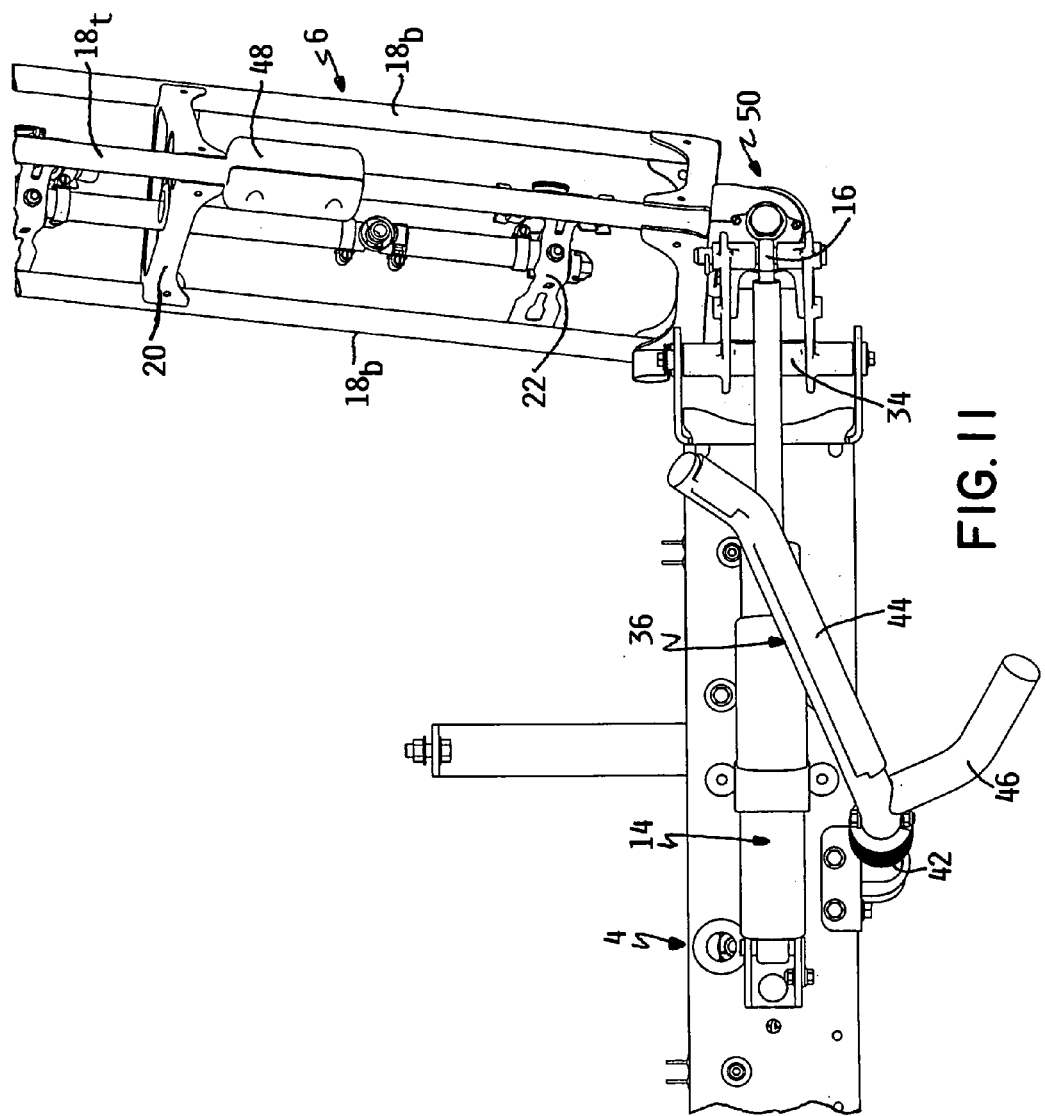
FIG. 11 is a top plan view of a portion of the sprayer of FIG. 1, particularly illustrating how the wing boom breaks away relative to the center boom if the wing boom hits an obstruction during reverse motion of the sprayer.

Referring now to FIG. 10, each end wall 54 of pivot part 52 has a contoured cam 60 that comprises a rounded ridge 62 interrupted by a central valley 64. Cams 60 on end walls 54 of each pivot part 52 are identical to one another but are offset 90° relative to one another. Referring to the left pivot part 52 shown in FIG. 10, ridge 62 and valley 64 of cam 60 carried on the top end wall 54 are perpendicular to the orientation of ridge 62 and valley on cam 60 carried on the bottom end wall 54 of the same pivot part 52. Thus, when the pair of pivot parts 52 that comprise breakaway pivot 50 are inverted relative to one another and assembled together, cams 60 at each end of the two assembled pivot parts 52 will nest together. Ridge 62 of one cam 60 will fit into the perpendicularly offset valley 64 of the other cam 60 at each end of the two assembled pivot parts 52.

Figure 7:
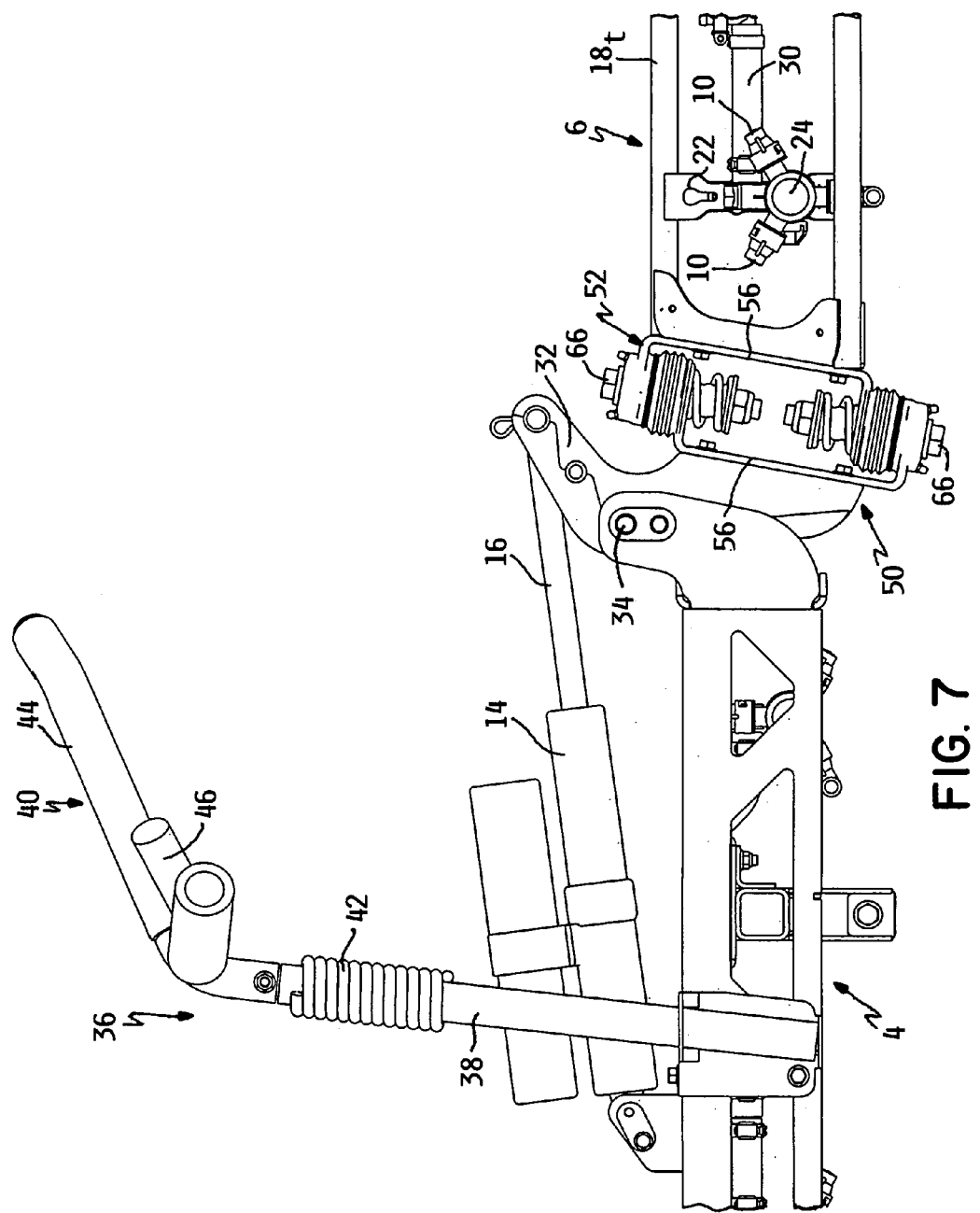
FIG. 7 is a partial front elevational view of one end of the center boom and one end of one of the wing booms, particularly illustrating the lift pivot and the breakaway pivot between the center boom and the wing boom and the support cradle that holds the wing boom in its transport position.

Referring to FIG. 7, a separate stub pivot pin 66 extends through the nested cams 60 on each end of breakaway pivot 50. The two stub pivot pins 66 lie along the common, inclined breakaway pivot axis y. Pivot pins 66 pivotally connect the two pivot parts 52 together. This permits wing boom 6 to pivot about breakaway pivot 50 axis y relative to center boom 4.

Figure 8:
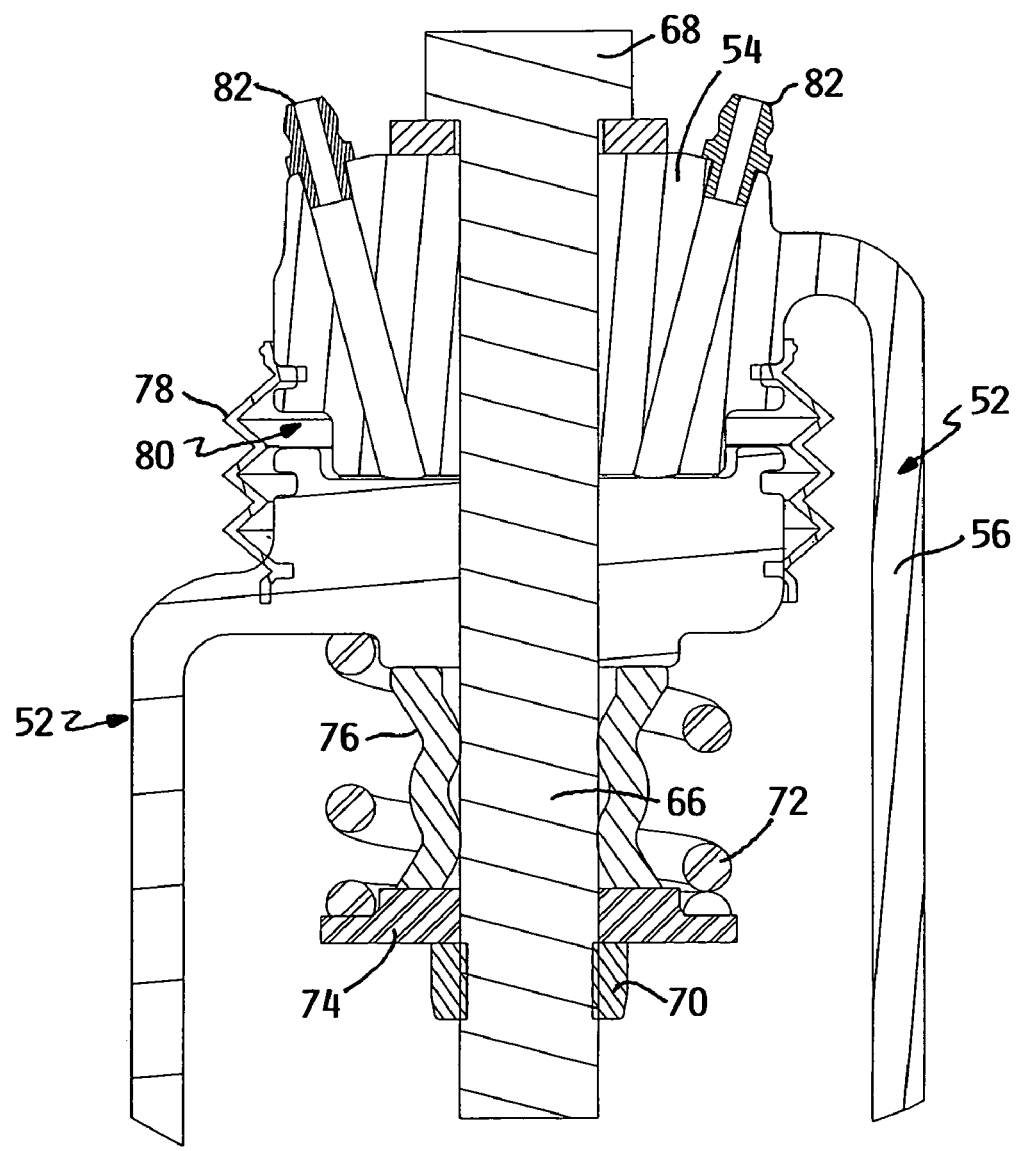
FIG. 8 is a cross-sectional view through a portion of the breakaway pivot of the wing boom, taken along lines 8-8 in FIG. 4.
Figure 9:
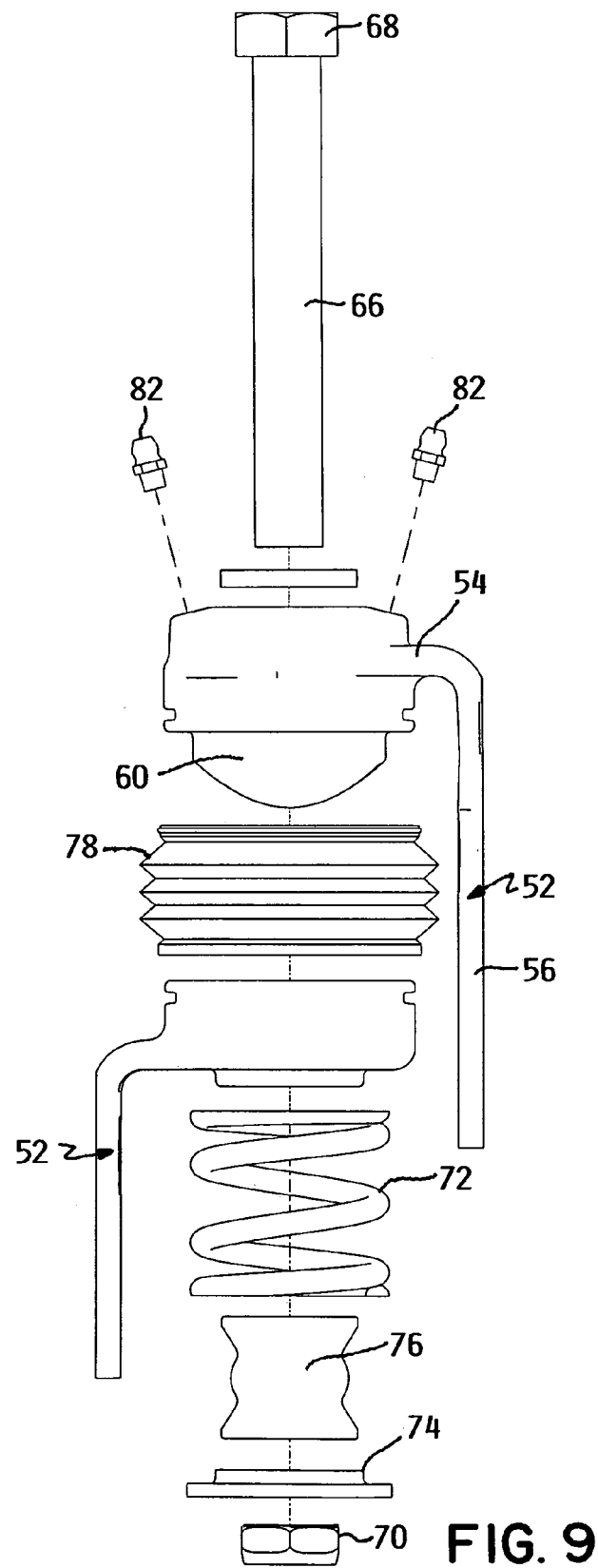
FIG. 9 is an exploded side elevational view of the portion of the breakaway pivot that is illustrated in FIG. 8.

Referring now to FIGS. 8 and 9, one end of pivot pin 66 includes an enlarged head 68 for bearing against one end wall 54 carrying one of the nested cams 60. The other end of pivot pin 66 is threaded and includes a nut 70 for providing an adjustable bearing surface. A spring 72 extends between a washer 74 abutted against the nut and the underside of the end wall carrying the other nested cam 60. In addition, a compressible rubber sleeve 76 surrounds pivot pin 66 between washer 74 and the underside of the end wall carrying the other nested cam 60. Together, spring 72 and sleeve 76 provide a biasing force tending to force the two cams 60 together into their nested relationship.

Figure 14:
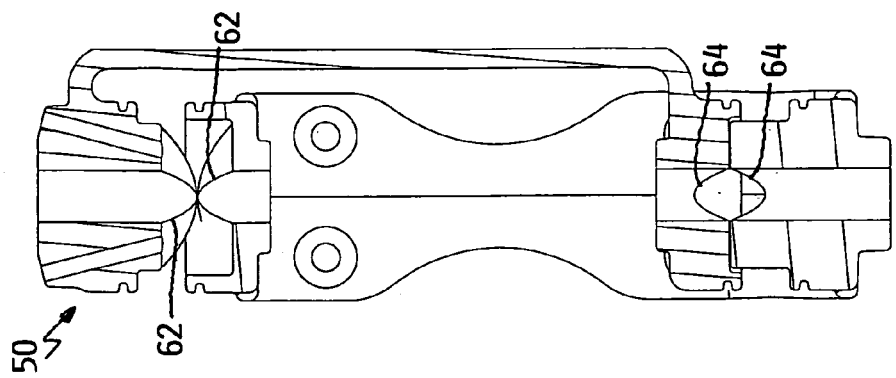
FIG. 14 is a cross-sectional view similar to FIG. 12, particularly illustrating the forced apart orientation of the cams from a direction that is perpendicular to that illustrated in FIG. 13.
Figure 13:
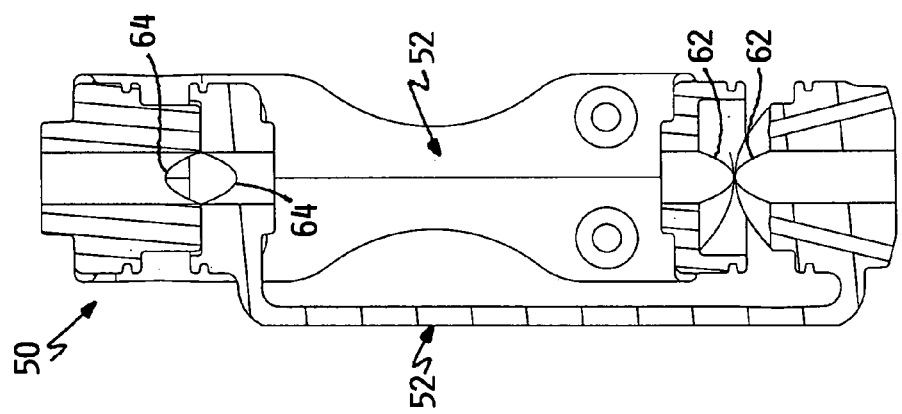
FIG. 13 is a cross-sectional view similar to FIG. 12, particularly illustrating how the cams are forced apart after the wing boom has been pivoted 900 relative to the center boom during breakaway caused by the wing boom hitting an obstruction during reverse motion of the sprayer.

Cams 60 along with spring 72 and sleeve 76 return wing booms 6 to their "in-line" spray position after an impact event during spraying. As noted earlier, this same mechanism comprising breakaway pivot 50 also allow wing booms 6 to "breakaway" out of cradles 36 during impact with a low-overhead object during transport.

In addition, a flexible sealing bellows 78 or the like surrounds and covers the junction between the two nested cams 60. This creates an enclosed chamber 80 around the two nested cams 60. See FIG. 8. Grease fittings 82 are provided on one of the pivot parts 52 to allow grease or some other lubricant to be injected into chamber 80. This keeps the interface between cams 60 lubricated to allow smooth pivoting of one pivot part 52 on the other pivot part 52.

Sleeve 76 also functions in two additional ways. First, sleeve 76 It provides an additional level of sealing to prevent fluids (rain, spray chemical, etc.) from running down pivot pin 66 and into the greased area protected by sealing bellows 78. In addition, sleeve 76 provides damping to breakaway pivot 50 to reduce the number of oscillations that occur after a spray-mode breakaway event prior to wing boom 6 returning to the stable, in-line spray position.

As noted earlier, when wing booms 6 are in their extended spraying position, they extend substantially beyond the side of center boom 4 and substantially laterally beyond the width of any vehicle which carries center boom 4 or to which center boom 4 is attached. Thus, it is quite possible that either wing boom might be driven into some type of obstruction, such as a tree or post, during forward or reverse motion of the vehicle and of sprayer 2. If this happens, breakaway pivot 50 allows wing boom 6 to breakaway during such forward or reverse motion, i.e. to pivot either rearwardly if wing boom 6 is moving forwardly at the moment of impact or to pivot forwardly if wing boom 6 is moving rearwardly at the moment of impact. Once wing boom 6 clears the obstruction, breakaway pivot 50 is designed to cause wing boom 6 to reset to its normal extended spraying position.

Referring now to FIGS. 12-14, as wing boom 6 pivots relative to center boom 4 during a breakaway event, nested cams 60 on each end of breakaway pivot 50 begin to rotate relative to one another. As this happens, ridge 62 that had been received in valley 64 begins to ride or cam itself up the slopes that bound valley 64, thereby permitting the pivoting to occur while forcing the two pivot parts 52 axially away from one another. Compare FIG. 13 or 14 to FIG. 12. This movement of the two pivot parts away from one another is of course resisted by the further tensioning of spring 72 and sleeve 76. However, if the two pivot parts 52 of breakaway pivot 50 actually pivot a full 90° relative to one another, nested cams 60 on either end of breakaway pivot 50 will have moved to fully non-nested conditions in which ridges 62 on cams 60 now abut face-to-face or ridge line-to-ridge line with one another. This is the condition shown in FIGS. 13 and 14.

Figure 12:
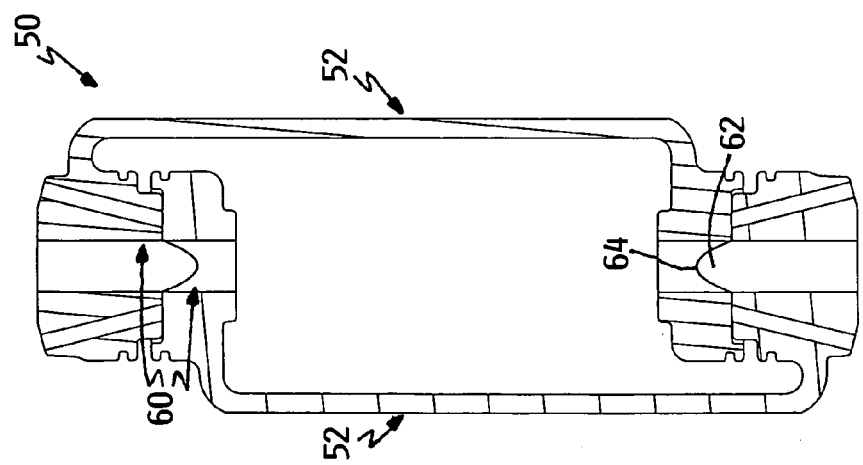
FIG. 12 is a cross-sectional view through the cams of the breakaway pivot of the wing boom, particularly illustrating how the cams nest together when the wing boom is in the extended spray position and is laterally aligned with the center boom.

As wing boom 6 pivots to breakaway from center boom 4 due to hitting an obstruction, wing boom 6 will also elevate somewhat as it pivots due to the inclination of breakaway pivot axis y. Once wing boom 6 clears whatever obstruction caused it to breakaway, the forces provided by spring 72 and sleeve 76, along with the force of gravity acting on whatever elevation wing boom 6 obtained as it pivoted, are free to act on wing boom 6. These forces all cause wing boom 6 to reset, namely to cause cams 60 to regain their fully nested orientation as shown in FIG. 12. In this position, wing boom 6 is back in its extended spraying position.

Thus, sprayer 2 of this invention allows each wing boom 6 to breakaway relative to the center boom bi-directionally in both forward and reverse motion of the vehicle and of sprayer 2. This is done using a simple, durable breakaway pivot 50 that is assembled using two identical but inverted pivot parts 52. Breakaway pivot 50 also provides the pivoting needed in wing booms to permit their folding into the X-shaped transport position as they engage the inclined first cradle arms 44 of support cradles 36. Accordingly, breakaway pivots 50 do double duty.

Various modifications of this invention will be apparent to those skilled in the art. Thus, this invention is to be limited only by the appended claims.

We claim:

1. A sprayer for spraying a liquid onto an upwardly facing surface, the sprayer being carried on a vehicle for moving the sprayer over the surface, which comprises:
    (a) a center boom carried on the vehicle;
    (b) a pair of wing booms pivotally mounted to opposite ends of the center boom;
    (c) a plurality of downwardly facing spray nozzles carried on the center and wing booms for spraying liquid downwardly onto the upwardly facing surface;
    (d) a breakaway pivot between each wing boom and each end of the center boom, each breakaway pivot configured to permit bi-directional pivoting of the wing boom relative to the center boom should the wing boom strike an obstruction during forward or reverse motion of the sprayer, wherein the breakaway pivot includes at least a first pair of cams that are nested together preceding a breakaway event and that become at least partially non-nested during a breakaway event; and
    (e) a member forming an enclosed chamber around the nested first pair of cams, and wherein the breakaway pivot includes at least one fitting for adding a lubricant to the chamber to lubricate movement of one cam in the first pair relative to the other cam in the first pair.

2. The sprayer of claim 1, wherein the breakaway pivot is arranged at an inclined angle relative to a vertical axis to cause the wing boom to lift as it pivots relative to the center boom during a breakaway event such that the force of gravity acting on the wing boom assists the wing boom in resetting following the breakaway event.

3. The sprayer of claim 2, wherein the breakaway pivot includes at least one spring that is acted on during the breakaway event in a manner that increases a biasing force provided by the spring such that the spring assists the force of gravity in resetting the wing boom following the breakaway event.

4. The sprayer of claim 1, wherein the breakaway pivot is formed of two identical pivot parts that are assembled together in an inverted relationship relative to one another.

5. The sprayer of claim 1, wherein each cam in the first pair comprises a rounded ridge interrupted by a central valley, the rounded ridge on one cam being received in the central valley of the other cam when the first pair of cams are nested together and the rounded ridge climbing up the slope of the valley during a breakaway event to force the first pair of cams axially apart.

6. The sprayer of claim 5, further including a spring whose biasing force is applied to the first pair of cams normally forcing the first pair of cams together to normally keep the cams nested together.

7. The sprayer of claim 6, wherein the biasing force of the spring is increased when the first pair of cams are axially forced apart during a breakaway event.

8. The sprayer of claim 1, further including a second pair of cams that are nested together preceding a breakaway event and that become at least partially non-nested during a breakaway event, the first and second pairs of cams being spaced apart axially along a breakaway pivot axis.

9. The sprayer of claim 1, wherein the breakaway pivot is arranged between each end of the wing boom and a pivotal lever carried on one end of the center boom, the pivotal lever pivoting about a longitudinal pivot axis.

10. The sprayer of claim 1, wherein the breakaway pivot returns the wing boom to a spray position in a controlled manner without requiring an operator to manually reset the wing boom.

11. A sprayer for spraying a liquid onto an upwardly facing surface, the sprayer being carried on a vehicle for moving the sprayer over the surface, which comprises:
    (a) a center boom carried on the vehicle;
    (b) a pair of wing booms pivotally mounted to opposite ends of the center boom for pivoting about longitudinal lift pivot axes to permit the wing booms to be raised into a vertically elevated transport position;
    (c) a plurality of downwardly facing spray nozzles carried on the center and wing booms for spraying liquid downwardly onto the upwardly facing surface; and
    (d) a pair of cam members arranged on the center boom to cam one wing boom forwardly and the other wing boom rearwardly as the wing booms are lifted into their transport position to place the wing booms in an X-shaped transport position relative to one another, wherein the camming of the wing booms caused by the cam members produces substantially all of the forward and rearward motion of the wing booms as the wing booms are being placed into the X-shaped transport position.

12. The sprayer of claim 11, wherein the cam members comprise cradles that also retain the wing booms in the transport position.

13. The sprayer of claim 12, wherein the cradles include forked tops that extend in opposite directions on the center boom with the forked tops pointing laterally outwardly towards each end of the center boom.

14. The sprayer of claim 13, wherein the forked tops include a first arm and a second arm connected together at a junction, the first arm of each cradle extending at an angle across a centerline of the center boom.

15. The sprayer of claim 14, wherein a top of the wing boom engages against and rides on the first arm of the cradle as the wing boom is raised into the transport position with the angled orientation of the first arm directing the wing boom either forwardly or rearwardly.

16. The sprayer of claim 15, wherein the first arm is longer than the second arm.

17. The sprayer of claim 13, wherein the forked tops of the cradles are flexibly secured to the center boom to allow the tops of the cradles to flex out of the way if a wing boom held within the cradle is forced out of the cradle by hitting an obstruction.

18. A sprayer for spraying a liquid onto an upwardly facing surface, the sprayer being carried on a vehicle for moving the sprayer over the surface, which comprises:
   (a) a center boom carried on the vehicle;
   (b) a pair of wing booms pivotally mounted to opposite ends of the center boom, wherein the wing booms can be folded upwardly relative to the center boom to dispose the wing booms in a vertically elevated transport position;
   (c) a plurality of downwardly facing spray nozzles carried on the center and wing booms for spraying liquid downwardly onto the upwardly facing surface; and
   (d) a pair of cradles for retaining the wing booms in their elevated transport positions, the cradles having a whip spring to allow the cradles to flex or tip relative to the center boom to release the wing booms from the cradles should a wing boom hit a low-overhead obstruction.

19. The sprayer of claim 1, wherein the chamber forming member comprises a flexible bellows that encloses and surrounds the first pair of cams.

20. A sprayer for spraying a liquid onto an upwardly facing surface, the sprayer being carried on a vehicle for moving the sprayer over the surface, which comprises:
   (a) a center boom carried on the vehicle;
   (b) a pair of wing booms pivotally mounted to opposite ends of the center boom;
   (c) a plurality of downwardly facing spray nozzles carried on the center and wing booms for spraying liquid downwardly onto the upwardly facing surface;
   (d) a breakaway pivot between each wing boom and each end of the center boom, each breakaway pivot configured to permit bi-directional pivoting of the wing boom relative to the center boom should the wing boom strike an obstruction during forward or reverse motion of the sprayer, wherein the breakaway pivot is formed of two identical pivot parts that are assembled together in an inverted relationship relative to one another, wherein each pivot part is U-shaped having facing, parallel end walls connected together by a side wall, wherein each end wall of each pivot part has a contoured cam with the cams on the end walls of each pivot part being identical to one another but offset 90° relative to one another such that the cams at each end of the two assembled pivot parts will axially nest together to form first and second pairs of axially spaced cams when the pair of pivot parts that comprise the breakaway pivot are inverted relative to one another and assembled together.

* * * * *